Patented Apr. 19, 1938

2,114,985

UNITED STATES PATENT OFFICE 2,114,985

COATING COMPOSITION

Elmer B. Schuler, Lakewood, Ohio, assignor to The Glidden Company, Cleveland, Ohio, a corporation of Ohio No Drawing. Application October 30, 1934, Serial No. 750,649

13 Claims. (Cl. 91—68)

This invention relates to coating compositions for use in the finishing of surfaces, and has particular reference to a new and novel composition for sealing in old finishing material or impurities, of a normally bleeding or lifting nature, before the application of new finish. More particularly, it contemplates the use of a water soluble proteid material, preferably casein, together with a special resin plasticizer made by reacting a polyhydric alcohol with boric acid.

Certain materials (particularly asphalt, oil soluble dyes and certain organic pigments), when present on a surface, "bleed" when other organic coatings are applied over them. This bleeding appears as a discoloration of the top film, often in a more or less blotchy manner. It is due partially to the action of the solvents used in the top coating, but also to the mutual solvent action of the film forming materials of the top and bottom coats for each other. Thus asphalt emulsion, when applied over oil paint, will bleed into the paint, without the presence of a mutual solvent other than the two film forming materials. The bleeding problem is particularly important in the refinishing of wood, a great deal of which is colored with oil stains, and the painting of surfaces of asphalt mastic, or which use asphaltic expansion joints.

When it is desired to finish over old paint with lacquer, it is often very desirable, in order to prevent lifting by lacquer solvents, to seal in the surface. This is particularly true in the case of the crystallizing lacquers, where slight variations in the solubility of the undercoat may seriously affect the crystal pattern of the top film.

A great many attempts have been made to solve the problem of bleeding. The two common expedients in use by finishers have been shellac and aluminum paint. Shellac gives fair results in the hands of expert finishers, when used over some oil dyes; but the sealing properties leave much to be desired when used over asphalt, the worst of the oil dyes, and most organic pigments. Aluminum paint likewise retards bleeding, due to the flaking action of the pigment; but it is at best an expedient which must be used skillfully, and then only gives satisfactory results on surfaces which do not bleed too badly. It must be borne in mind that both of these materials are disturbed by the top-coatings; and this disturbance is what results in the bleeding.

Shellac and other materials have likewise been used as sealers over old paint for use under lacquer, to prevent lifting, with somewhat greater success; but there has been heretofore no material which could be used successfully to seal old paint, so as to permit the application of crystallizing lacquer. This is due to the fact that most sealers which resist the action of crystallizing lacquer solvents are themselves dissolved in such strong solvents that they tend to lift the old paint.

The use of proteid water soluble coatings, particularly casein, has been suggested heretofore for these uses, together with other water soluble coatings, such as latex and sodium silicate. Three outstanding difficulties were encountered, at least one appearing with each product. One was porosity of film, which permitted the bleeding or solvent action to pass through the film. A second was lack of adhesion, either of the sealer to the surface, or of the finishing material to the sealer. The third was brittleness of the sealer, whereby hair lines were formed after prolonged drying, permitting eventual bleeding or poor crystallization along the hair lines. This type of failure was the only one noticeable with the proteid type sealers.

It has heretofore been proposed to plasticize casein and other proteids, in an attempt to promote flexibility of film and thus get efficient sealing. Glycerol, the most common softener, helps the flexibility but destroys adhesion. The same is true of the glycols, triacetine, and other water soluble glyceryl esters. The water insoluble glyceryl esters, such as the drying oils and similar fatty bodies, may be emulsified with the coating to give flexible, adherent films; but the presence of these esters causes bleeding. Sulphonated castor oil gave similar results.

I have discovered that when a proteid sealer is plasticized with a water soluble resinous ester obtained by reacting a polyhydric alcohol with boric acid, the brittleness is overcome with an actual improvement in adhesion; and unlike other flexibilizing agents which do not destroy adhesion, the borate resin has no solvent action on the undercoater, so that a perfect seal is obtained.

These esters are obtained by heating together a polyhydric alcohol such as glycerol, ethylene glycol, etc. with boric acid.

Example 1

100 grams of ethylene glycol and 50 grams of boric acid were heated together. Condensation commenced at 220° F., and the reaction was carried to 400° F., over a period of 90 minutes. Evolution of water ceased at 400° F. The product at this stage was a soft sticky resin. It was dissolved in 25 cc. of hot water; on cooling, a white precipitate was thrown out, which redissolved on the addition of ammonia.

Example 2

500 grams of glycerol were reacted with 240 grams of boric acid. The temperature was run to 530° F., and held for 2 hours, when evolution of water ceased. The product was cooled to 150° F., and dissolved in 100 cc. of water and 80 cc. of 26° Baumé ammonia solution.

This product, like the last, yields a white precipitate on cooling an acid solution, which is not obtained when ammonia is used. Other alkali may be used to prevent precipitation, but I prefer to use ammonia because of its volatility; in this manner, undercoats and top-films are not saponified by my sealer.

The reaction is generic for the polyhydric alcohols; but I do not know of any acid, other than boric acid, which gives a water soluble resin which will meet the requirements of my sealer.

The resin plasticizer need not be dissolved in alkaline water, but may be added to an alkaline casein, glue or gelatine solution direct. I prefer, however, to make a solution similar to that of Example 2, so that mixing with the proteid solution will take place smoothly, without any precipitation of the proteid by the acid reacting resin.

The ratio of boric acid to polyhydric alcohol may be varied somewhat; but in any case, a highly acid product is obtained, the ester apparently having both free acid and free hydroxy groups. Boric acid, used in equimolar proportions with glycerol, yields a resin which is slightly too hard to give substantial plasticizing effect; I prefer to maintain the molecular ratio between .60 and .80 mol. of boric acid per mol. of glycerol. With glycol, the ratio may be run up so that the glycol hydroxyls are equivalent to the boric acid hydrogens, i. e. 1½ mols glycol per mol. of boric acid.

Example 3

As an example of a finished composition incorporating my invention, I swelled 130 pounds of milk casein in 40 gallons of water, and 7½ gallons of a soap solution containing 2 ounces of ordinary white laundry soap and one ounce of cresol per gallon. To the mixture, after swelling for 2 hours, I added 2½ gallons of 26° Baumé ammonia and 10 gallons of water, and passed in steam for 45 minutes, until solution was complete. I then added 35 gallons of water, to obtain a clear ammonium caseinate solution. To this batch was added 4½ gallons of the solution of resin plasticizer obtained in Example 2.

Example 4

A solution of the protein derived from soya bean meal was made up, just as the casein solution of Example 3. To this was added 33 pounds of the resin of Example 1, and 1 gallon of 26° Baumé ammonia. The resin gave some difficulty on solution, due to some precipitation at the resin-solution interface; but active stirring cleared this up.

Example 5

A solution of 10 grams of gelatine was made in 100 cc. of water. To this was added 10 grams of the solution of resin plasticizer of Example 2. A clear solution was obtained.

Care should be taken in all cases, because of the acid character of my resin plasticizer, that an excess of alkali be present, to insure complete solubility. As indicated above, I prefer to use ammonia, in order to minimize alkali action on the paint films.

While the resin plasticizer improves the adhesion and flexibility of the proteids, even when used in small amounts, I find that perfect sealing cannot be obtained with substantially less than a ratio of 1 resin plasticizer to 4 of casein. With a ratio of resin plasticizer to casein of above 1 to 1, the coating becomes hygroscopic and nondrying.

The concentrations of proteid in the sealer may be varied, as is well known in the art, to give thin to viscous liquids; the solutions used in the examples are typical prior art solutions.

The sealers of Examples 3, 4 and 5 may be used over bleeding surfaces, and can be recoated without any bleeding. They adhere to the undercoatings, and permit of adhesion of the topcoatings, at the same time presenting an impervious seal to interaction between them. It is this adhesion which differentiates my product from the prior art sealers, of proteid material and some plasticizer which destroys adhesion.

The sealers of my examples are formulated to dry fairly rapidly, so that after 4 hours a top coat may be applied. With sealers made with ratio of resin plastizer to casein approaching 1 to 1, the necessary drying time is lengthened, so that an overnight dry is preferred.

Similarly, the use of my sealers over old paint permits of perfect crystallization of crystallizing lacquer over any old surface. While heretofore a great many surfaces could be finished in this manner, care was necessary in picking the surface, and it was necessary to have a uniform surface as undercoat. This sealer permits the use of crystallizing lacquer over old painted surfaces over which crystallization would not ordinarily be possible, such as old inside flat wall paint; and it permits of crystallization over an object finished with different materials in certain areas, by sealing all types of old finish alike.

My improved sealer may also be used in other places where it is desired to separate two finishing coats, while at the same time maintaining adhesion and flexibility—for example, between an undercoat of crystallizing lacquer, and a top coat of another lacquer, which would, in the absence of the sealer, destroy the crystalline structure in the bottom film.

It should be borne in mind, in using my sealer, that it is water soluble, and even after ageing is affected by water. It should, therefore, not be used where it will be subject to the action of water, unless a protective top coat is used over it.

Modification of my invention, not shown in the examples, may of course be made without departing therefrom, the essence of the invention being the discovery that the boric acid-polybasic alcohol resins, when mixed with water soluble proteid coatings, give flexible films which adhere to old coatings, and to which top coats adhere, while at the same time sealing the two coatings from each other.

I claim:

1. A sealing coating composition comprising an ammonia casein solution in water, and a resin plasticizer comprising a condensation product of glycerol and boric acid, the glycerol being in molecular excess over the boric acid.

2. A sealing coating composition comprising an ammonia casein solution in water, and a resin plasticizer comprising a condensation product of glycerol and boric acid, the ratio of boric acid to glycerol being from .60 to .80 mol. of boric acid per mol. of glycerol.

3. A sealing coating composition as in claim 2, the ratio of casein to resin plasticizer being from 4 to 1 to 1 to 1 by weight.

4. An article having a surface coating thereon normally disturbable by top-coatings containing organic solvents, a sealing film thereon obtained from a composition comprising a water solution of a proteid, and a resin plasticizer comprising the condensation product of a polyhydric alcohol and boric acid, and a top film thereover obtained from a coating composition which would disturb the surface coating in the absence of the sealing film.

5. An article having a surface coating thereon normally disturbable by top-coatings containing organic solvents, a sealing film thereon obtained from a composition comprising a water solution of casein, and a resin plasticizer comprising the condensation product of a polyhydric alcohol and boric acid, and a top film thereover obtained from a coating composition which would disturb the surface coating in the absence of the sealing film.

6. An article having a surface coating thereon normally disturbable by top-coatings containing organic solvents, a sealing film thereon obtained from a composition comprising a water solution of casein, and a resin plasticizer comprising the condensation product of glycerol and boric acid, and a top film thereover obtained from a coating composition which would disturb the surface coating in the absence of the sealing film.

7. An article having a surface coating thereon normally disturbable by top-coatings containing organic solvents, a sealing film thereon obtained from a composition comprising an ammonia casein solution in water and a resin plasticizer comprising a condensation product of glycerol and boric acid, the glycerol being in molecular excess over the boric acid, and a top film thereover obtained from a coating composition which would disturb the surface coating in the absence of the sealing film.

8. An article having a surface coating thereon normally disturbable by top-coatings containing organic solvents, a sealing film thereon obtained from a composition comprising an ammonia casein solution in water, and a resin plasticizer comprising a condensation product of glycerol and boric acid, the ratio of boric acid to glycerol being from .60 to .80 mol. of boric acid per mol. of glycerol, and a top film thereover obtained from a coating composition which would disturb the surface coating in the absence of the sealing film.

9. An article having a surface coating over which crystallizing lacquer will not form a uniform design, a sealing film thereon obtained from a composition comprising a water solution of a proteid, and a resin plasticizer comprising the condensation product of a polyhydric alcohol and boric acid, and a crystallized lacquer film over said sealing film.

10. An article having a surface coating over which crystallizing lacquer will not form a uniform design, a sealing film thereon obtained from a composition comprising a water solution of casein, and a resin plasticizer comprising the condensation product of a polyhydric alcohol and boric acid, and a crystallized lacquer film over said sealing film.

11. An article having a surface coating over which crystallizing lacquer will not form a uniform design, a sealing film thereon obtained from a composition comprising a water solution of casein, and a resin plasticizer comprising the condensation product of glycerol and boric acid, and a crystallized lacquer film over said sealing film.

12. An article having a surface coating over which crystallizing lacquer will not form a uniform design, a sealing film thereon obtained from a composition comprising an ammonia casein solution in water and a resin plasticizer comprising a condensation product of glycerol and boric acid, the glycerol being in molecular excess over the boric acid, and a crystallized lacquer film over said sealing film.

13. An article having a surface coating over which crystallizing lacquer will not form a uniform design, a sealing film thereon obtained from a composition comprising an ammonia casein solution in water, and a resin plasticizer comprising a condensation product of glycerol and boric acid, the ratio of boric acid to glycerol being from .60 to .80 mol. of boric acid per mol. of glycerol, and a crystallized lacquer film over said sealing film.

ELMER B. SCHULER.